United States Patent
Pereira Madeira

(10) Patent No.: US 7,758,018 B2
(45) Date of Patent: Jul. 20, 2010

(54) FLAP VALVE FOR CLOSING AND OPENING A CHANNEL

(75) Inventor: Pedro Miguel Pereira Madeira, Asperg (DE)

(73) Assignee: Mann + Hummel GmbH, Ludwigsburg (DE)

( * ) Notice: Subject to any disclaimer, the term of this patent is extended or adjusted under 35 U.S.C. 154(b) by 386 days.

(21) Appl. No.: 11/830,214

(22) Filed: Jul. 30, 2007

(65) Prior Publication Data

US 2008/0023663 A1 Jan. 31, 2008

Related U.S. Application Data

(63) Continuation of application No. PCT/EP2006/050303, filed on Jan. 19, 2006.

(30) Foreign Application Priority Data

Jan. 31, 2005 (DE) ........................ 10 2005 004 532

(51) Int. Cl.
*F16K 1/22* (2006.01)
(52) U.S. Cl. ...................................... 251/308; 251/305
(58) Field of Classification Search ................. 251/305, 251/306, 307, 308
See application file for complete search history.

(56) References Cited

U.S. PATENT DOCUMENTS

| 3,507,192 | A |   | 4/1970  | Stokke           |         |
|-----------|---|---|---------|------------------|---------|
| 3,568,975 | A | * | 3/1971  | Obermaier et al. | 251/58  |
| 3,774,879 | A |   | 11/1973 | Zink             |         |
| 4,513,771 | A | * | 4/1985  | Thomas et al.    | 137/315.24 |
| 4,981,284 | A | * | 1/1991  | Imamura et al.   | 251/305 |
| 5,401,001 | A |   | 3/1995  | Cook et al.      |         |
| 5,901,677 | A |   | 5/1999  | Ohrnberger et al.|         |
| 6,138,988 | A | * | 10/2000 | Bouvet et al.    | 251/306 |
| 2003/0111628 | A1 |  | 6/2003 | Nanba et al.     |         |

FOREIGN PATENT DOCUMENTS

| EP | 0 736 137 B1  | 10/1996 |
| WO | WO 95/18295 A1 | 7/1995 |

OTHER PUBLICATIONS

International Search Report dated Mar. 31, 2006 with English translation of relevant portion (Four (4) pages).

* cited by examiner

*Primary Examiner*—John K Fristoe, Jr.

(57) ABSTRACT

A flap (21) having a flap encompassing frame (11) and provided with first (22) and second (26) flap bearings, in which at least one top part of a housing (16) is fixed to the flap frame by a snap-in connection. A support arm (24) pivotable about the flap axis is arranged on the top part of the housing, and at least one front face (31) of the flap axis is brought into contact with a support surface (30) of the support arm, and a slight air gap of the bearing is adjusted between support surface and the front face, thereby assuring a practically play-free axial mounting of the flap.

10 Claims, 2 Drawing Sheets

FLAP VALVE FOR CLOSING AND OPENING A CHANNEL

CROSS REFERENCE TO RELATED APPLICATIONS

This application is a continuation of international patent application no. PCT/EP2006/050303, filed Jan. 19, 2006, designating the United States of America and published in German on Aug. 3, 2006 as WO 2006/079601, the entire disclosure of which is incorporated herein by reference. Priority is claimed based on Federal Republic of Germany patent application no. DE 10 2005 004 532.4, filed Jan. 31, 2005.

BACKGROUND OF THE INVENTION

The present invention relates to a flap valve for closing and opening a channel, particularly in an intake system of an internal combustion engine.

U.S. Pat. No. 5,901,677 (=EP 736,137) discloses a flap valve of this type. It is a synthetic resin (i.e., plastic) component arranged in an intake system of an internal combustion engine. This component, which is also referred to as a drum controller, has stub shafts on both ends, one of which is supported in a flange via a needle bush and the other is screwed to an end face of a component. A lever connected to a vacuum box is arranged on one stub shaft and is used to rotate the drum controller.

A disadvantage of this arrangement is that it requires a screwed connection of the drum controller to prevent axial play. This screwed connection is complex and comparatively costly on the one hand, and there is a risk that friction can arise as a result of the axial fixation, which makes the system difficult to actuate on the other hand. This construction does not ensure system availability under all operating conditions.

SUMMARY OF THE INVENTION

It is an object of the invention to provide an improved flap valve for closing an opening a channel.

Another object of the invention to provide a valve for closing or opening a channel which has a simple and comparatively economical construction.

A further object of the invention is to provide a valve mechanism for closing or opening a channel which is reliable and easy to operate and assures system availability under all operating conditions.

These and other objects are achieved in accordance with the present invention by providing a flap valve having a housing and a pivotable valve shaft for closing or opening a channel, said valve having a bearing arrangement at each end and an actuating drive adjacent the bearing at one end, wherein the bearing adjacent the drive is a radially acting bearing, and the valve shaft is supported axially by a support arm attached to the housing.

An advantage of the invention is that the axial fixation is not provided by a screwed connection or by tongue and groove connections. Rather, a support arm is provided, which is fixed to the housing and supports the valve shaft axially at a single point or by a very small support surface. This makes it substantially easier to mount the valve, which is simply inserted and requires no axial bearing components. While the axial support on the one side of the valve shaft is effected by the support arm fixed to the housing, the support on the other side can be provided, for example, by a conical bearing or a radial bearing with axial limitation.

According to another embodiment of the invention, the valve is moved by a drive lever and a drive shaft arranged thereon, with a vacuum box provided to produce a linear motion for the drive. Vacuum boxes of this type have been used successfully in automotive engineering. They translate a change in the engine vacuum into a motion component and operate with great reliability.

In a further refinement, the radially acting bearing is at least one ball bearing. The ball bearing can be sealed by a corresponding sealing lip.

In another embodiment of the invention, the housing or the housing parts are formed of a thermoplastic synthetic resin material. If the support arm is also made of a thermoplastic material, it can be attached to the housing by welding.

It is of course also possible to screw or latch the support arm to the housing. If it is welded, friction welding or ultrasonic welding is preferred.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
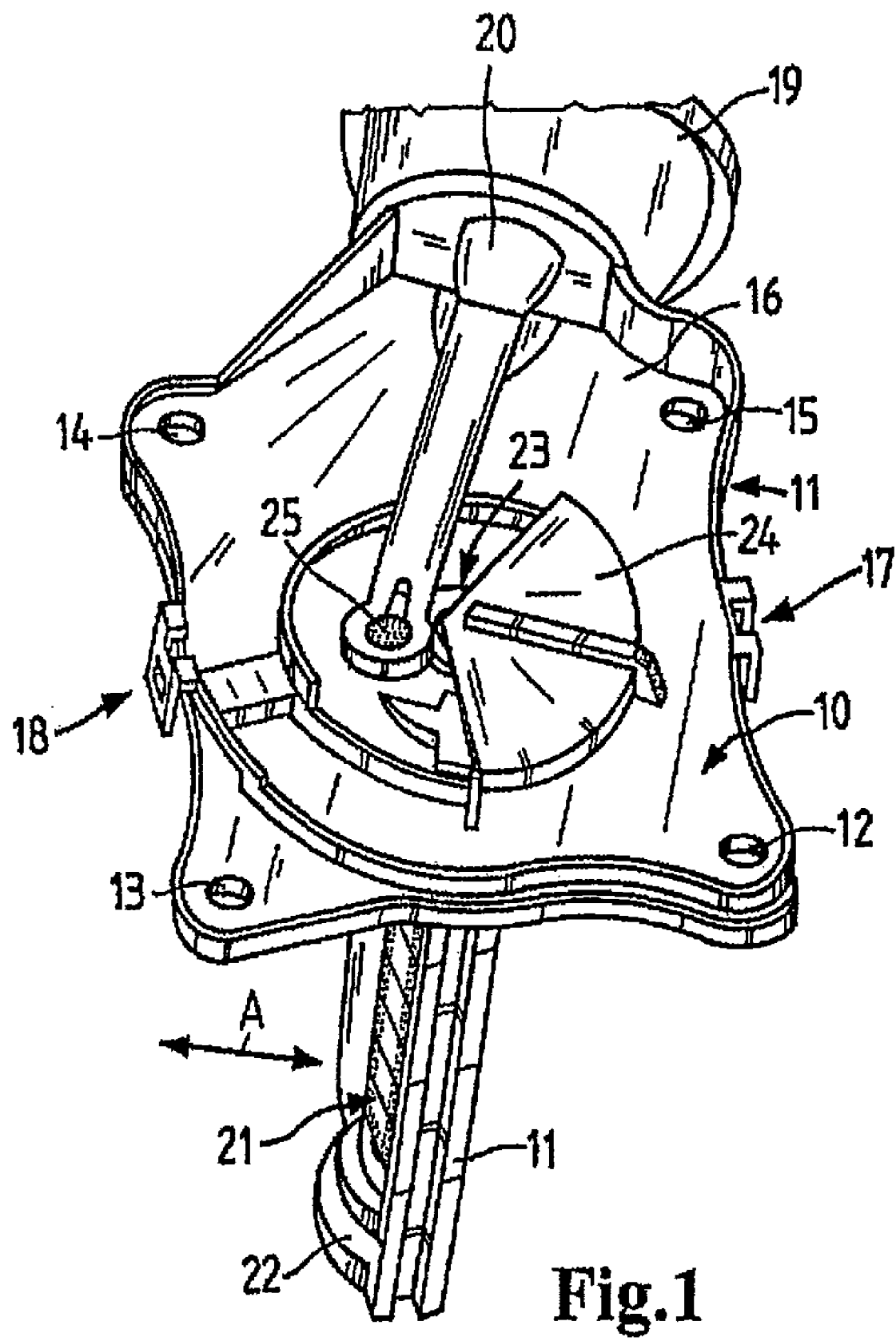
FIG. 1 is a perspective view of a control valve in accordance with the present invention.

The perspective view depicted in FIG. 1 shows a housing 10 having a valve frame 11. The housing 10 can be fixed to an intake system of an internal combustion engine via mounting bores 12, 13, 14 and 15. The housing is formed of two parts, such that the valve frame is latched together with the upper housing part 16 by two clip-type connectors 17, 18. The upper housing part 16 is inserted in the contact region with the valve frame 11 and adjusted by the defined contours and by the clip-type connectors 17, 18.

A vacuum box 19 is disposed on the upper housing part 16. This vacuum box has a plunger 20, which is moved axially by a vacuum controlled by a corresponding control unit. Within the valve frame 11 is a flap valve 21 for opening or closing a passage or a channel. The channel itself is not shown. In the position of the flap valve 21 shown here, the channel extends perpendicularly to the valve plane in the direction of arrow "A." On the bottom side, the valve is supported in a sliding bearing 22 formed by the valve frame 11. At the top there is a ball bearing 26, which will be described in more detail with reference to FIG. 2.

The actuation of the flap valve 21 is effected by a lever 23 located on the topside. The center of the lever is located underneath a support 24. The lever is equipped with a ball-type connector 25 at its point of attachment. The plunger 20 engages with a correspondingly formed opening via this connector. The connection is achieved when the plunger 20 snaps into the ball-type connector.

Figure 2:
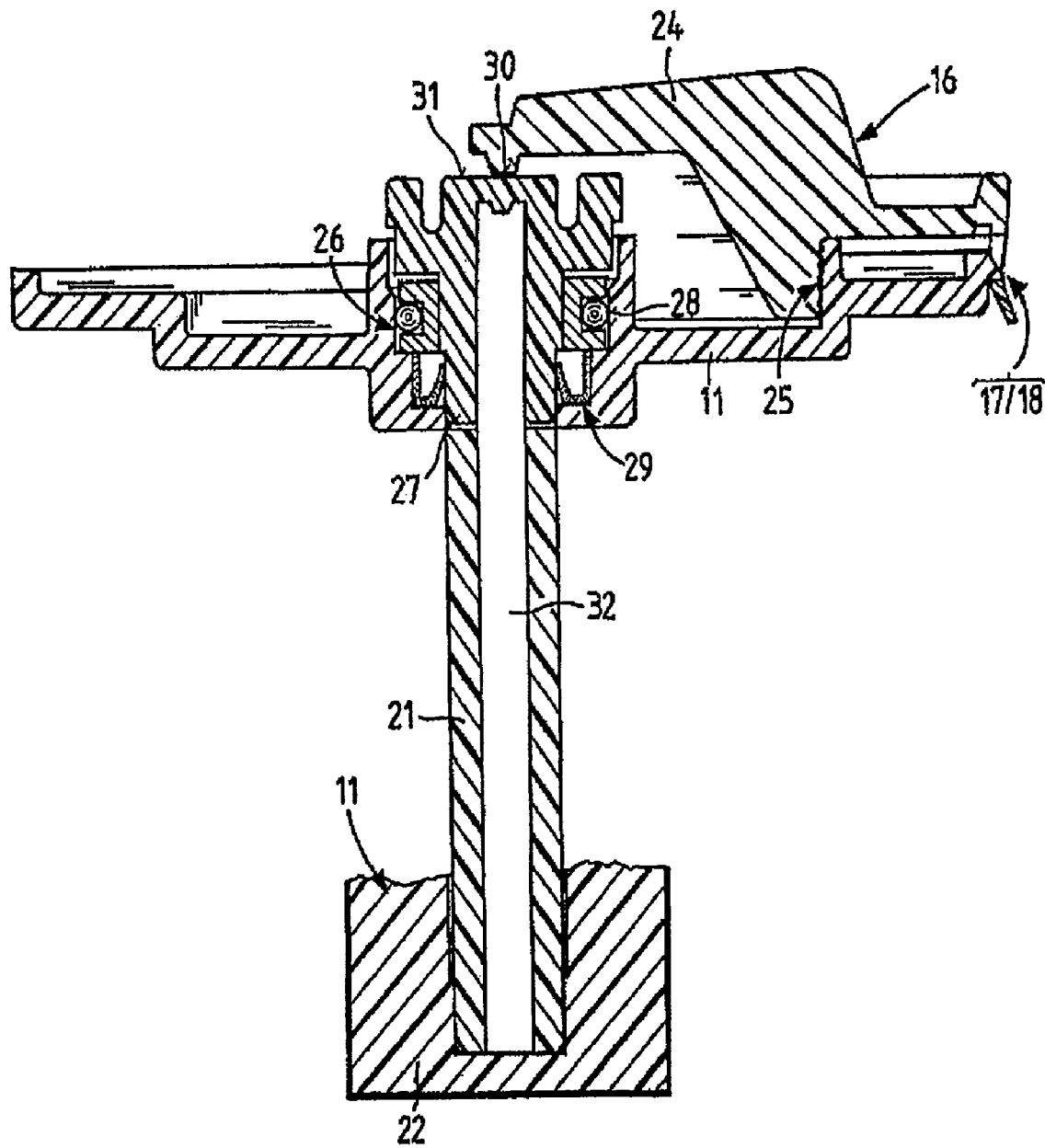
FIG. 2 is a sectional view of the shaft support for a flap valve of the invention.

FIG. 2 is a sectional view illustrating the detailed solution for the axial and radial bearing arrangement of the flap valve 21. The friction bearing 22 is located on the bottom side, a ball bearing 26 is provided in the upper region. The inner race of the ball bearing rests adjacent the valve shaft or axis 27. There is no outer race; the balls directly contact a bearing surface 28 of the valve frame 11. A sealing lip 29 in the form of a profiled gasket is provided to seal the bearing gap.

The axial movement of the flap valve 21 is limited by the support 24, which together with the upper housing part 16 is welded to the valve frame 11 in the region 25. The support 24 has a support surface 30 that faces the valve shaft and is spaced at a small distance from the end face 31 of the valve shaft. This ensures a slight axial bearing clearance, which is adjustable and which can be defined particularly by the welding process for the support 24. If the support 24 together with the upper housing part 16 is clipped to the valve frame 11, the axial clearance is defined by the structural configuration and the dimensioning in relation to each other.

To optimize the weight of the flap valve 21, the valve shaft has a hollow volume 32. This hollow volume also provides a configuration of the valve that is suitable for synthetic resin material.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A flap valve arrangement comprising:
   a housing including:
   a valve frame; and
   a upper housing part secured to said valve frame;
   a support arm secured to said valve frame;
   a flap valve including a pivotable valve shaft operable to actuate said flap valve to close or open a channel, said valve shaft defining an outward facing valve shaft end face;
   a bearing arrangement at each end and of said valve shaft, said bearing arrangement rotatably supporting said valve shaft on said valve frame;
   an actuating drive adjacent the bearing arrangement at one end of said valve shaft,
   wherein said support arm defines a support surface configured proximate to and contactable with said shaft end face, said support surface operable to limit axial movement of said valve shaft relative to said valve frame.

2. The flap valve arrangement according to claim 1, wherein the valve is actuated by a drive lever connected to a reciprocating drive shaft, and
   a vacuum box is provided for reciprocating the drive shaft.

3. The flap valve arrangement according to claim 1, wherein the bearing arrangement at said one end of said valve shaft comprises at least one ball bearing, and
   a sealing gasket is provided adjacent the ball bearing, said sealing gasket sealing said said ball bearing from said channel.

4. The flap valve arrangement according to claim 1, wherein the support arm and at least part of the housing are formed of a thermoplastic synthetic resin material, and
   the support arm is attached to the valve frame by friction welding or ultrasonic welding.

5. The flap valve arrangement according to claim 1, wherein the support arm is attached to the valve frame by a snap-in connection.

6. The flap valve arrangement according to claim 1, wherein
   the bearing arrangement at said one end of said flap valve is a ball bearing;
   wherein said support arm is fixed to the valve frame by a snap-in connection; and
   wherein the support surface of the support arm overlaps a pivot axis of said valve shaft.

7. The flap valve arrangement according to claim 6, wherein said shaft end face of the valve shaft contacts said support surface of the support arm, contact between said support surface and said end face operable to ensure a play-free axial support of the valve.

8. The flap valve arrangement according to claim 6, wherein a small gap is adjusted between said support surface of the support arm and said end face of the valve shaft to ensure a substantially play-free axial mounting of the valve.

9. The flap valve arrangement according to claim 1, wherein the valve is installed in an intake channel of an internal combustion engine for selectively closing or opening the intake channel in response to a vacuum produced by operating conditions of the internal combustion engine.

10. The flap valve arrangement according to claim 1, wherein
    at least one of said bearing arrangements is positioned proximate to said support arm and a different one of said bearing arrangements is positioned distally spaced from said support arm; and
    wherein said valve frame includes an elongated support member extending axially along a rotary axis of said valve shaft, said elongated support member configured to support said distally spaced bearing arrangement on said valve frame.

* * * * *